(12) United States Patent
Morikawa et al.

(10) Patent No.: US 11,926,889 B2
(45) Date of Patent: Mar. 12, 2024

(54) COPPER ALLOY PLATE, COPPER ALLOY PLATE WITH PLATING FILM, AND METHODS FOR PRODUCING THESE

(71) Applicant: MITSUBISHI MATERIALS CORPORATION, Tokyo (JP)

(72) Inventors: Kenji Morikawa, Aizuwakamatsu (JP); Naoki Miyashima, Aizuwakamatsu (JP); Kazunari Maki, Aizuwakamatsu (JP); Shinichi Funaki, Aizuwakamatsu (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/630,691

(22) PCT Filed: Aug. 5, 2020

(86) PCT No.: PCT/JP2020/030058
§ 371 (c)(1),
(2) Date: Jan. 27, 2022

(87) PCT Pub. No.: WO2021/025071
PCT Pub. Date: Feb. 11, 2021

(65) Prior Publication Data
US 2022/0316028 A1      Oct. 6, 2022

(30) Foreign Application Priority Data

Aug. 6, 2019   (JP) .................... 2019-144181

(51) Int. Cl.
*C22C 9/04*        (2006.01)
*B32B 15/01*       (2006.01)
(Continued)

(52) U.S. Cl.
CPC ............ *C22C 9/04* (2013.01); *B32B 15/01* (2013.01); *B32B 15/20* (2013.01); *C25D 3/38* (2013.01); *C25D 5/50* (2013.01)

(58) Field of Classification Search
None
See application file for complete search history.

(56) References Cited

FOREIGN PATENT DOCUMENTS

| CN | 106460097 A | 2/2017 |
|---|---|---|
| EP | 2743381 A1 | 6/2014 |

(Continued)

OTHER PUBLICATIONS

Supplementary European Search Report dated Jul. 13, 2023, issued for the European Patent Application No. 20850133.8.
(Continued)

*Primary Examiner* — Xiaobei Wang
(74) *Attorney, Agent, or Firm* — Locke Lord LLP (57) ABSTRACT

A copper alloy plate containing in a center part of a plate thickness direction more than 2.0% (% by mass) and 32.5% or less of Zn; 0.1% or more and 0.9% or less of Sn; 0.05% or more and less than 1.0% of Ni; 0.001% or more and less than 0.1% of Fe, and 0.005% or more and 0.1% or less of P; and the balance Cu, including a surface layer part in which a surface Zn concentration in a surface is 60% or less of a center Zn concentration in the center part, having a depth from the surface to where Zn concentration is 90% of the center Zn concentration; and in the surface layer, the Zn concentration increases from the surface toward the center part in the plate thickness direction at a concentration gradient of 10% by mass/μm or more and 1000% by mass/μm or less.

9 Claims, 1 Drawing Sheet

(51) Int. Cl.
    *B32B 15/20*     (2006.01)
    *C25D 3/38*     (2006.01)
    *C25D 5/50*     (2006.01)

(56) References Cited

FOREIGN PATENT DOCUMENTS

| | | |
|---|---|---|
| EP | 3020838 A1 | 5/2016 |
| JP | H02-125830 A | 5/1990 |
| JP | H05-33087 A | 2/1993 |
| JP | 2003-160829 A | 6/2003 |
| JP | 3717321 B2 | 11/2005 |
| JP | 2006-283060 A | 10/2006 |
| JP | 2007-051370 A | 3/2007 |
| JP | 2007-084923 A | 4/2007 |
| JP | 3953357 B2 | 8/2007 |
| JP | 5303678 B1 | 10/2013 |
| JP | 2015-160994 A | 9/2015 |
| TW | 201612326 A | 4/2016 |

OTHER PUBLICATIONS

The Search Report of the Office Action dated Jan. 8, 2024, issued for the Taiwan Patent Application No. 109126648.

COPPER ALLOY PLATE, COPPER ALLOY PLATE WITH PLATING FILM, AND METHODS FOR PRODUCING THESE

BACKGROUND OF THE INVENTION

Technical Field

The present invention relates to a copper alloy plate in which brass (Cu—Zn alloy) contains Sn, Ni, Fe, and P, a copper alloy plate with a plating film formed by plating the copper alloy plate, and methods for producing these. Priority is claimed on Japanese Patent Application No. 2019-144181, filed Aug. 6, 2019, the content of which is incorporated herein by reference.

Background Art

For conductive members for electrical/electric use such as a terminal such as a connector in a semiconductor device or a movable conductive piece in an electromagnetic relay, copper or copper alloy is used; among others brass (Cu—Zn alloy) is usually and widely used from the view point of strength, workability, and balance of costs. In a case of a terminal such as a connector, in order to increase mainly reliability of contact to a conductive member of the other side, it is increased to use by plating tin (Sn) on a surface of a base material (a raw plate) made of Cu—Zn alloy; and also, a case is increased that Cu—Zn—Sn based alloy in which Sn is added to Cu—Zn alloy itself of the base material is used considering adaptability of recycling.

However, a problem is that anti-stress relaxation property is low in these Cu—Zn—Sn based alloy, so in order to increase the anti-stress relaxation property, measures described in Patent Document 1 to Patent Document 5 have been suggested from the past.

In Patent Document 1, it is described to increase the anti-stress relaxation property by containing Ni in Cu—Zn—Sn based alloy to generate Ni—P based compound. In Patent Document 2, it is described that strength, elasticity, and heat-resistance can be possibly improved by adding Ni and Fe along with P to Cu—Zn—Sn based alloy. Although there is no direct description about the anti-stress relaxation property in Patent Document 2, it seems that the improvement of the above-mentioned strength, the elasticity, and the heat-resistance means improvement of the anti-stress relaxation property.

Patent Document 3 describes that the anti-stress relaxation property can be improved by adding Ni to Cu—Zn—Sn based alloy and adjusting a ratio of Ni/Sn into a specific range. It is also described that it is effective for improving the ant-stress relaxation property to add a very small quantity of Fe.

Patent Document 4 is directed to a lead frame, and describes that the anti-stress relaxation property can be improved by adding P along with Ni and Fe to Cu—Zn—Sn based alloy and adjusting an atom ratio of (Ni+Fe)/P within a range of 0.2 to 3 to generate Fe—P based compound, Ni—P based compound, or Fe—Ni—P based compound.

It is possible to improve the anti-stress relaxation property to a certain degree owing to the proposals of Patent Document 1 to Patent Document 4; however, it is not sufficient and further improvement has been required. In the above situation, as described in Patent Document 5, it has been found that the anti-stress relaxation property can be further improved by adjusting a total amount of Fe, Ni, and P, ratios of (Ni+Fe)/P, Fe/Ni, and Sn/(Ni+Fe) in well balance.

As described above, copper alloy for a conductive member of an electronic/electric device made of copper alloy in which Sn, Ni, Fe, and P are contained in brass (Cu—Zn alloy) has been enabled to have an excellent anti-stress relaxation property especially in a member such as a connector which is press rolled into a thin plate (a string) and has a bended part to which a bending work is subjected to, being made to be in contact with the other-side conductive member in the vicinity of the bended part, to maintain a contact state with the other-side conductive member by own elasticity of the bended part.

Patent Document

[Patent Document 1]
 Japanese Unexamined Patent Application, First Publication No. H05-33087
[Patent Document 2]
 Japanese Unexamined Patent Application, First Publication No. 2006-283060
[Patent Document 3]
 Publication of Japanese Patent No. 3953357
[Patent Document 4]
 Publication of Japanese Patent No. 3717321
[Patent Document 5]
 Publication of Japanese Patent No. 5303678

SUMMARY OF INVENTION

Technical Problem

Copper alloy containing Zn has a balance between an excellent mechanical strength and a good conductivity, because of the added Zn. However, solder wettability is deteriorated and there is a risk of deteriorating an electrical connection reliability. Particularly, although there are many cases in which base material is subjected to Sn plating and then a heating and melting treatment (reflowing treatment) in order to further improve the electrical connection reliability in the electronic/electric conductive member, there is a risk of considerable deterioration of the solder wettability on a surface of the Sn plating in the copper alloy containing Zn when such a treatment is subjected to, and also adhesiveness of a plating film may be deteriorated.

The present invention is achieved in consideration of the above circumstances, and has an object to improve the solder wettability and the adhesiveness of the plating film in a copper alloy plate containing Zn.

Solution to Problem

Considering the above circumstances, the inventors have found as a result of earnest research that the deterioration of the solder wettability is caused by oxidization of Zn existing on a surface of the base material; and that, especially, the solder wettability is remarkably deteriorated since Zn in the base material is diffused and arrives at a surface of the plating film by heating when the base material is subjected to the Sn plating and then the heat-melt treatment. In this case, an Sn—Cu alloy layer is formed because Cu in the base material of copper alloy is alloyed with Sn and an Sn—Cu alloy layer is formed, so that Zn is taken into the Sn—Cu alloy layer and Zn is easy to be diffused to a surface of an Sn layer above it (the surface of the plating film).

Since Zn is an active element, Zn on the surface of the copper alloy plate before plating immediately becomes oxidized Zn. In a case in which a copper alloy plate having a lot of Zn on the surface is plated, metal bond is not easy to be formed by the oxidized Zn on the surface of the base material with metal in the plating film; accordingly, the adhesiveness of the plating film is deteriorated and it is easy to be peeled off by heating and the like.

Based on such findings, the invention is devised to improve the solder wettability and the adhesiveness by appropriately adjusting concentration of Zn on a surface layer part of a copper alloy plate to restrain the oxidization at the surface and to reduce the Zn concentration in a plating film even if the plating film is formed.

A copper alloy plate of the present invention contains in a center part of a plate thickness direction more than 2.0% (% by mass, the same hereafter) and 32.5% or less of Zn; 0.1% or more and 0.9% or less of Sn; 0.05% or more and less than 1.0% of Ni; 0.001% or more and less than 0.1% of Fe, and 0.005% or more and 0.1% or less of P; and the balance Cu with inevitable impurities. The copper alloy has a surface layer part in which a surface Zn concentration in a surface is 60% or less of a center Zn concentration in the center part, having a depth from the surface to where Zn concentration is 90% of the center Zn concentration. In the surface layer, the Zn concentration increases from the surface toward the center part at a concentration gradient of 10% by mass/μm or more and 1000% by mass/μm or less.

Oxidized Zn is not easily generated on a surface of this copper alloy plate since the surface Zn concentration is low as that the surface Zn concentration is 60% or less of the center Zn concentration. Therefore, the electric connection reliability is excellent and it can be used as a contact just as it is, and it is possible to prevent the plating film from peeling off when the plating film is formed on the surface. Furthermore, even in a case in which the heat treatment is performed after forming the plating film, it is possible to restrain the diffusion of Zn into the plating film. Accordingly, the solder wettability is excellent even on the surface of the plating film.

In view of inhibiting oxidation of the surface of the copper alloy plate and prevention of the diffusion of Zn to the plating film, the surface Zn concentration is preferably 60% or less of the center Zn concentration. Moreover, since the Zn concentration changes sharply in the surface layer part, the surface layer part is thin and an excellent mechanical characteristic of copper alloy is maintained.

In the surface layer part, if the concentration gradient from the surface is less than 10% by mass/μm, the above-mentioned characteristic of restraining the diffusion of Zn is saturated; on the other hand, desired Zn concentration cannot be obtained to a considerable depth and the characteristic of the copper alloy plate containing Zn is deteriorated. On the other hand, if the concentration gradient of Zn exceeds 1000% by mass/μm, the surface layer part where the Zn concentration is low is too thin, the effect of restraining the diffusion of Zn becomes poor.

As one aspect of the copper alloy plate, a thickness of the surface layer part is 0 μm or more and 1 μm or less. If the thickness of the surface layer part exceeds 1 μm, a proportion to the whole plate thickness of an area where the Zn concentration is low becomes large, and the mechanical characteristic as copper alloy containing Zn may be deteriorated. This deterioration of the characteristic is conspicuous specially when the plate thickness is thin.

The copper alloy plate with a plating film is provided with the copper alloy plate and a plating film formed on the surface layer part of the copper alloy plate.

Since the surface Zn concentration of the copper alloy layer is low and the surface of the copper alloy plate has not much quantity of the oxidized Zn, the adhesiveness of the plating film is excellent. Moreover, it is possible to decrease Zn that is diffused from the copper alloy plate into the plating film, so that the solder wettability is excellent.

As one aspect of the copper alloy plate with a plating film, an average concentration of Zn in the plating film is 10% or less of the center Zn concentration.

If the average concentration of Zn in the plating film exceeds 10% of the center Zn concentration of the copper alloy plate, the surface diffusion of Zn largely influences on the contact resistance.

Another aspect of the copper alloy plate with a plating film consists of one or more layers selected from tin, copper, zinc, gold, silver, palladium, and alloy of them. Since the plating film is from these metal or alloy, it can be appropriately used as a connecter terminal.

A method of manufacturing a copper alloy plate has steps of a Zn condense treatment diffusing Zn on a surface and concentrate it to form a surface part in which Zn is concentrated; and a surface part removal treatment removing the surface part and forming the surface layer part.

In this manufacturing method, Zn in the copper alloy containing Zn is diffused to the surface part at first and concentrate it, and then the surface part which is concentrated is removed. The surface layer part formed after removing the surface part has low Zn concentration and an oxide film is less generated, so that the solder wettability is excellent.

In a method of manufacturing a copper alloy plate with a plating film of the present invention, the plating film is formed on the copper alloy plate by electroplating at 0.1 A/dm$^2$ or more and 60 A/dm$^2$ or less of an electric current density. If the electric current density is less than 0.1 A/dm$^2$, it is not economic since a film forming is slow. If the electric current density exceeds 60 A/dm$^2$, it exceeds diffusion-limited current density and a film cannot be formed without defects.

For example, in a case in which tin electroplating treatment is performed as the above-mentioned electroplating treatment, reflow treatment can be performed for improving anti-whisker property. That is, as one aspect of the method of manufacturing a copper alloy plate with a plating film, the plating film contains tin, and after the electroplating treatment is performed, reflow treatment is performed at 230° C. or more and 330° C. or less of heating peak temperature, preferably 300° C. or less, for 0.5 seconds or more and 30 seconds or less of heating time at the heating peak temperature, preferably for one second or more and 20 seconds or less.

If the peak heating temperature while the treatment is less than 230° C. or the heating time is less than 0.5 seconds, tin does not melt. If the heating temperature exceeds 330° C. or the heating time exceeds 30 seconds, the diffusion of Zn to the surface of the plating film advances by the excess heating, so that the solder wettability is deteriorated.

Advantageous Effects of Invention

According to the present invention, the surface can be prevented from oxidizing and the electric connection reliability and the solder wettability of the surface of the copper alloy plate are improved, so that the Zn concentration in the plating film is reduced even when the plating film is formed, and improvement of the solder wettability of the surface of the plating film and improvement of the adhesiveness between the plating film and the copper alloy plate are achieved.

DESCRIPTION OF EMBODIMENTS

An embodiment of the present invention will be explained.

Figure 1:
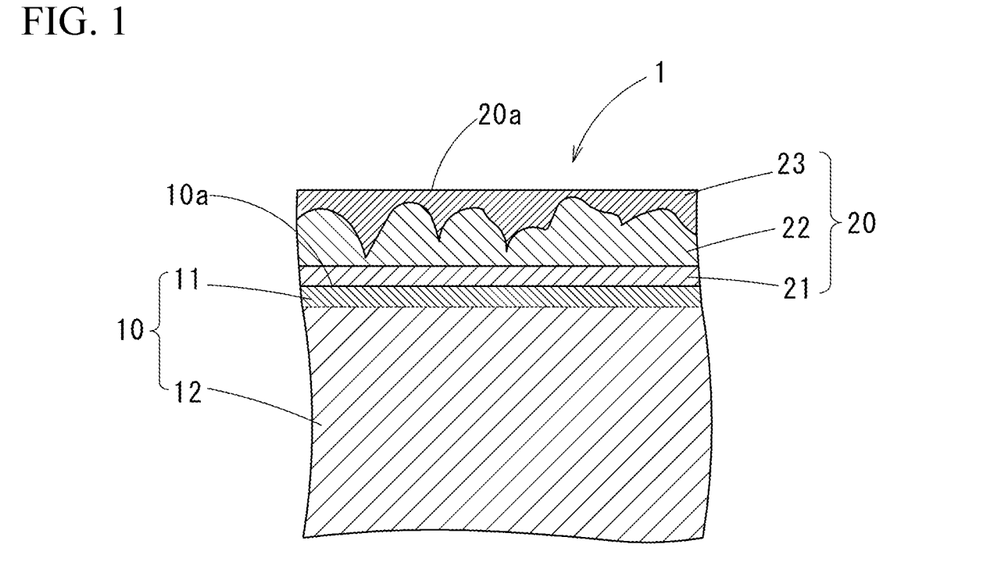
FIG. 1 It is a cross sectional view schematically showing one embodiment of a copper alloy plate with a plating film according to the present invention.

As shown in FIG. 1, a copper alloy plate 1 with a plating film of this embodiment has a plating film 20 formed by sequentially laminating a Cu layer 21, an Sn—Cu alloy layer 22, and an Sn layer 23 on a surface 10a of a copper alloy plate 10 containing Zn and Sn, Ni, P, and Fe.

[Copper Alloy Plate]

The copper alloy plate 10 has, at a center part in a plate thickness direction, Zn of more than 2.0% and 32.5% or less, Sn of 0.1% or more and 0.9% or less, Ni of 0.05% or more and less than 1.0%, Fe of 0.001% or more and less than 0.1%, and P of 0.005% or more and 0.1% or less, and the balance Cu and inevitable impurities by mass % (hereinafter, content percentages of elements are the same).

(Zn)

Zn (zinc) is a basic alloy element in copper alloy (brass) which is an object in the present invention, and is an effective element for improving a strength and spring property of the copper alloy plate 10. Since Zn is inexpensive in comparison with Cu, it is effective for reducing material cost of the copper alloy plate 10. If the Zn concentration is 2.0% or less, the reduction effect of the material cost cannot be sufficiently obtained. The improving effects of the strength and the spring characteristic are not either sufficient. By contrast, if the Zn concentration exceeds 32.5%, the anti-stress relaxation property is deteriorated: even if Fe, Ni, and P are added, it is difficult to maintain the sufficient anti-stress relaxation property; corrosion resistance is deteriorated; and cold roll-ductility and bending workability are also deteriorated since β phases are considerably generated. Therefore, the Zn concentration is in a range of more than 2.0% and 32.5% or less. Moreover, the Zn concentration is preferably in a range of 4.0% or more and 32.5% or less; more preferably, in a range of 8.0% or more and 32.0% or less; and it is especially preferable in a range of 8.0% or more and 27.0% or less.

In this case, the Zn concentration is more than 2.0% and 32.5% or less of the Zn concentration in the center part of the plate thickness (center Zn concentration); and the Zn concentration at the surface 10a (surface Zn concentration) is 60% or less (and 0% or more) of the center Zn concentration. The Zn concentration has a concentration gradient from the surface toward the center of the plate thickness at 10 mass %/μm or more and 1000 mass %/μm or less.

Since in the copper alloy plate 10 the surface Zn concentration is 60% or less of the center Zn concentration, the oxidized Zn is hardly generated on the surface 10a; and moreover, even when it is plated and the heat treatment is performed afterward, it is possible to restrain the diffusion of Zn into the plating film 20. Accordingly, the solder wettability is excellent and the plating film 20 can be prevented from peeling off.

In view of preventing oxidization of the surface 10a and restraining the diffusion of Zn to the plating film 20, it is sufficient that Zn is not contained in the surface 10a (i.e., the surface Zn concentration is 0% of the center Zn concentration). However, if the surface Zn concentration is 60% or less of the center Zn concentration, it is appropriate since the characteristic as copper alloy containing Zn is given even on the surface to a certain degree. More preferably, the surface Zn concentration is 40% or less of the center Zn concentration; even more preferably, 30% or less.

If the concentration gradient of Zn along the plate thickness from the surface 10a is less than 10 mass %/μm, intended Zn concentration cannot be achieved to a considerable depth, and the characteristic as the copper alloy plate containing Zn is deteriorated. By contrast, if the concentration gradient of Zn exceeds 1000 mass %/μm, the part where the concentration gradient (a surface part stated below) is generated is too thin, so that the effect of restraining the diffusion of Zn is poor. The concentration gradient of Zn is preferably 20 mass %/μm or more and 500 mass %/μm; more preferably, 50 mass %/μm or more and 200 mass %/μm or less.

In the part where the concentration gradient is generated, a range from a depth part where the Zn concentration is 90% of the center Zn concentration to the surface 10a is regarded as a surface layer part 11. The surface layer part 11 has a thickness of 0 μm or more and 1 μm or less; preferably 0.3 μm or less; more preferably, 0.2 μm or less. With respect to this surface layer part 11, an inner part than the surface layer part 11 is regarded as a base material inner part 12.

Figure 2:
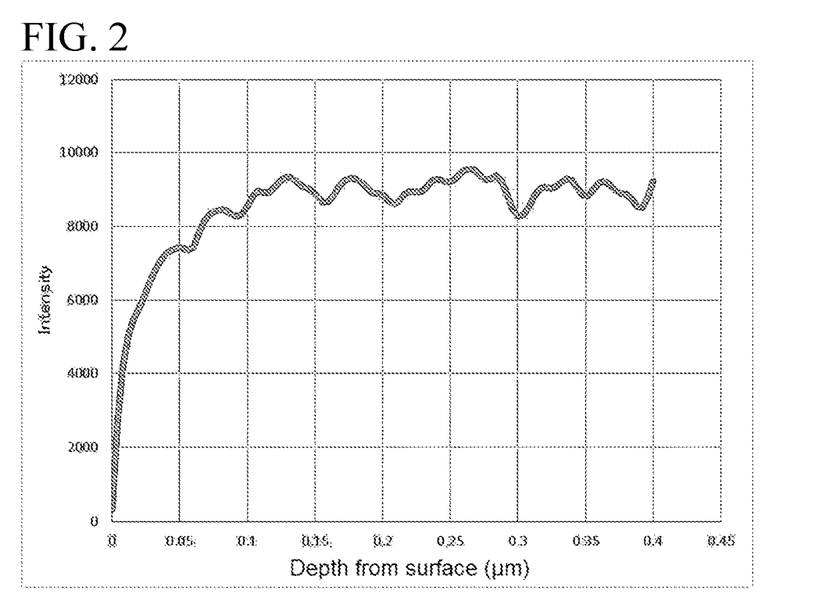
FIG. 2 It is an analysis diagram measuring Zn component in a depth direction of the copper alloy plate by XPS.

FIG. 2 is a graph showing results of analyzing Zn component in the depth direction in test pieces obtained by film-thinning the copper alloy plate 10 in the plate thickness direction with an X-ray photoelectron spectroscopy (XPS): a transverse axis is a depth from the surface 10a, and a vertical axis is a spectral intensity of XPS. Zn concentration measured at the center part in the plate thickness direction of the base material is stable, and an arithmetic mean value of the maximum value and the minimum value was the "center Zn concentration"; and a depth (from the surface 10a) to the part where Zn concentration changing from the surface 10a toward the center part in the plate thickness first reaches 90% of the center Zn concentration was the "surface layer thickness".

(Sn, Ni, Fe, P)

Addition of Sn (tin) is effective for improving the strength of the copper alloy plate 10; and for brass alloy of the base material of the electric/electronic device used with performing the Sn plating, to add Sn is advantageous to improve adaptability for recycling of brass material with a Sn plating. Furthermore, the Inventors have found by research that Sn contributes toward improving the anti-stress relaxation property of the copper alloy plate 10 if it coexists with Ni and Fe. If Sn is less than 0.1%, these effects cannot be sufficiently obtained; by contrast, if Sn exceeds 0.9%, hot workability and cold roll-ductility are deteriorated, so that breakages may occur in hot rolling and cold rolling, and the electric conductivity is also deteriorated.

Therefore, addition of Sn was in a range of 0.1% or more and 0.9% or less. In the above-described range, the Sn concentration is especially preferably in a range of 0.2% or more and 0.8% or less.

Ni is a characteristic additive element as Fe and P in the present invention; by adding proper quantity of Ni to Cu—Zn—Sn alloy to make Ni coexist with Fe and P, [Ni, Fe]—P based precipitate can be precipitated from a parent phase (mainly α phases). Moreover, by making Ni coexist with Fe, Co, and P, [Ni, Fe, Co]—P based precipitate can be precipitated from a parent phase (mainly α phases).

Since these [Ni, Fe]—P based precipitate and [Ni, Fe, Co]—P based precipitate exist, an average crystal grain size of copper that is the parent phase can be reduced by an effect of pinning crystal grain boundaries while recrystallization. As a result, the strength of the copper alloy plate 10 can be increased. Moreover, by reducing the average crystal grain size as above described, the bending workability and anti-stress corrosion cracking property can be also improved. Furthermore, since these precipitates exist, the anti-stress relaxation property can be remarkably improved. Besides, since Ni coexists with Fe, Co (Cobalt), and P, there is effect not only on the anti-stress relaxation property of improving by the precipitates, but also on improving the strength by solid-dissolve strengthening. Here, if the addition of Ni is less than 0.05%, the anti-stress relaxation property cannot be improved sufficiently. By contrast, if the addition of Ni is 1.0% or more, a large quantity of Ni is solid-dissolved into the parent phase and the conductivity is decreased; and the cost may be increased since the amount use of raw material of expensive Ni is increased.

Accordingly, the addition of Ni was in the range of 0.05% or more and less than 1.0%. The addition of Ni is preferably in the above range, especially in a range of 0.05% or more and less than 0.8%.

Fe (iron) is a characteristic additive element in the present invention; by adding proper quantity of Fe to Cu—Zn—Sn alloy to make Fe coexist with Ni and P, [Ni, Fe]—P based precipitate can be precipitated from the parent phase (mainly α phases). Moreover, by making Fe coexist with Ni, Co, and P, [Ni, Fe, CO]—P based precipitate can be precipitated from the parent phase (mainly α phases).

Since these [Ni, Fe]—P based precipitate or [Ni, Fe, Co]—P based precipitate exist, the average crystal grain size of copper can be reduced by an effect of pinning crystal grain boundaries while recrystallization: and as a result, the strength of the copper alloy plate 10 can be increased. Moreover, by reducing the average crystal grain size as above described, the bending workability and anti-stress corrosion cracking property can be also improved. Furthermore, since these precipitates exist, the anti-stress relaxation property can be remarkably improved. Here, if the addition of Fe is less than 0.001%, the effect of pinning the crystal boundaries cannot be sufficiently obtained, so that sufficient strength cannot be obtained. By contrast, even if the addition of Fe is 0.10% or more, the strength cannot be more increased, more Fe is solid dissolved into the parent phase and the electrical conductivity is deteriorated, and furthermore the cold roll-ductility is also deteriorated.

Accordingly, the addition of Fe is in the range of 0.001% or more and less than 0.10%. The addition of Fe is preferably in the above range, especially in a range of 0.002% or more and 0.08% or less.

P (phosphorus) has a connectivity to Fe, Ni, and further Co; if proper quantity of P is contained with Fe and Ni, [Ni, Fe]—P based precipitate can be precipitated. If proper quantity of P is contained with Fe, Ni, and Co, [Ni, Fe, Co]—P based precipitate can be precipitated.

Since these precipitates exist, the anti-stress relaxation property of the copper alloy plate 10 can be improved. Here, if the addition of P is less than 0.005%, it is difficult to sufficiently precipitate [Ni, Fe]—P based precipitate or [Ni, Fe, Co]—P based precipitate, so that it is not possible to sufficiently improve the anti-stress relaxation property. By contrast, if the addition of P exceeds 0.10%, a solid-solution amount of P into the parent phase increases, so that the electric conductivity is decreased and the roll-ductility is also deteriorated causing the breakage in cold rolling.

Accordingly, the addition of P was in the range of 0.005% or more and 0.10% or less; in addition, the addition of P is preferably in the above range, especially in a range of 0.01% or more and 0.08% or less.

P is an element easily contaminated inevitably from melted material of copper alloy; accordingly, in order to control the addition of P as above described, it is desirable to select melted material appropriately.

The balance of the above elements can basically be Cu (copper) and inevitable impurities. Here, the inevitable impurities are Mg, Al, Mn, Si, (Co), Cr, Ag, Ca, Sr, Ba, Sc, Y, Hf, V, Nb, Ta, Mo, W, Re, Ru, Os, Se, Te, Rh, Jr, Pd, Pt, Au, Cd, Ga, In, Li, Ge, As, Sb, Ti, Tl, Pb, Bi, S, O, C, Be, N, H, Hg, B, Zr, rare earth, and the like; it is desirable that a total amount of the inevitable impurities is 0.3 mass % or less.

Regarding Co, it can be contained 0.001% or more and less than 0.10% intentionally. Adding Co in this range with Ni, Fe, and P, [Ni, Fe, Co]—P based precipitate is generated; so that the anti-stress relaxation property of the copper alloy plate 10 can be further improved. Here, if the addition of Co is less than 0.001%, the further more improving effect of the anti-stress relaxation property by adding Co cannot be obtained; by contrast, if the addition of Co is 0.10% or more, solid-dissolved Co increases and the electric conductivity is deteriorated, and the cost is increased by increasing the use amount of the expensive Co raw material.

Therefore, the addition of Co when Co is added was in the range of 0.001% or more and less than 0.10%. The addition of Co is preferably in the above range, especially in a range of 0.002% or more and 0.08% or less. Moreover, even in a case in which Co is not positively added, it is needless to say that Co of less than 0.001% may be contained as an impurity.

[Plating Film]

The plating film 20 is formed from the Cu layer 21 having a thickness of 0 μm to 1 μm, the Sn—Cu alloy layer 22 having a thickness of 0.1 μm to 1.5 μm, and the Sn layer 23 having a thickness of 0.1 μm to 3.0 μm in this order from the surface 10a of the copper alloy plate 10 to the surface 20a of the plating film 20.

If the thickness of the Cu layer 21 exceeds 1 μm, thermal stress generated in a plating film layer is increased when heating, and the plating film 20 may be peeled off. This Cu layer 21 may not exist.

The Sn—Cu alloy layer 22 is hard; if the thickness is less than 0.1 μm, the effect of reducing the insertion force when it is used as a connector is reduced and the strength is deteriorated. If the thickness of the Sn—Cu alloy layer 22 exceeds 1.5 μm, the thermal stress generated in the plating film 20 is high when heating, and the plating film may be peeled off.

If the thickness of the Sn layer 23 is less than 0.1 μm, the solder wettability is deteriorated; if the thickness exceeds 3.0 μm, the thermal stress generated in the plating film 20 may be increased when heating.

The average concentration of Zn in the plating film 20 having the above-described layer structure is 10% or less (0% or more) of the center Zn concentration of the copper alloy plate 10.

If the average concentration of Zn in the plating film 20 exceeds 10% of the center Zn concentration of the copper alloy plate 10, Zn in the plating film diffuses to the surface 20a and the solder wettability may be deteriorated. The average concentration of Zn in the plating film 20 is preferably 5% or less of the center Zn concentration of the copper alloy plate 10; more preferably, 3% or less.

[Manufacturing Method]

The method manufacturing the copper alloy plate 1 with a plating film configure as above will be explained.

The copper alloy plate 1 with a plating film is manufactured by producing a copper alloy base material having a composition containing more then 2.0% and 32.5% or less of Zn, 0.1% or more and 0.9% or less of Sn, 0.05% or more and less than 1.0% of Ni, 0.001% or more and less than 0.1% of Fe, 0.005% or more and 0.1% or less of P, and the balance Cu and inevitable impurities (producing step of base material for copper alloy), performing a surface treatment on the copper alloy base material (surface treatment step), performing plating treatment (plating step), and then reflowing (reflow treatment step).

(Producing Step of Copper Alloy Base Material)

The copper alloy base material is produced by making a copper alloy ingot by melting/casting material formulated in the above composition range, and performing steps including processes of hot rolling, cold rolling, continuous annealing, and finishing cold rolling in this order on the copper alloy ingot. In this example, a plate thickness of the copper alloy base material was 0.2 mm.

(Surface Treatment Step)

A surface treatment is subjected to the obtained copper alloy base material. This surface treatment has a Zn condense treatment in which Zn in the copper alloy base material is diffused to the surface part and concentrated there, and a surface part removal treatment removing the surface part where Zn is concentrated.

As the Zn condense treatment, the copper alloy base material is heated in oxidizing atmosphere such as oxygen, ozone, and the like at a prescribed temperature for a prescribed time. The heating temperature and heating time in this case is carried out at 100° C. or more and for a time in which recrystallization is not generated; among them, it may be carried out at any temperature considering restriction of equipment, economy and the like. For example, at 300° C. for one minute, at 250° C. for two hours; or at 200° C. for five hours; if it is low temperature then for a long time, and if it is high temperature then for a short time.

Concentration of the oxidation substance in the oxidizing atmosphere is 5 to 4000 ppm if it is ozone, desirably 10 to 2000 ppm, more desirably 20 to 1000 ppm. In a case in which ozone is not used but oxygen is used, it is desirable that the atmosphere concentration is twice or more the case in which only ozone is used. It is applicable that the oxidization substance such as ozone and oxygen may be mixed and used. Before the Zn condense treatment, a treatment for promoting the diffusion of Zn, such as the introduction of strain and holes due to mechanical polishing or the like, may be performed.

For the surface part removal treatment, it can be performed on the copper alloy base material which is subjected to the Zn condense treatment applicating independently or in combination of chemical polishing, electrolytic polishing, mechanical polishing and the like.

For the chemical polishing, selective etching or the like can be used. For the selective etching, etching using acidic or alkaline liquid containing component which can restrain copper corrosion such as nonionic surfactant, heterocyclic compound having carbonyl group or carboxyl group, imidazole compound, triazole compound, and tetrazole compound can be used.

For the electrolytic polishing, for example, etching or the like which uses acid or alkaline liquid as electrolytic solution, preferentially on crystal grain boundaries by electrolytic on component which is easily segregated on the crystal grain boundaries of copper can be used.

For mechanical polishing, various methods which are generally used, such as blast treatment, wrapping treatment, polishing treatment, buffing, grinder polishing, sandpaper polishing and the like, can be used.

As described above, by performing the Zn condense treatment and the surface part removal treatment on the copper alloy base material, the copper alloy plate 10 is formed. The copper alloy plate 10 is, as described above, the Zn concentration of the surface layer part 11 is lower than the center Zn concentration, and Zn concentration increases from the surface 10a toward the center part in the plate thickness direction at a prescribed concentration gradient.

(Plating Treatment Step)

Next, plating treatment is carried out on the surface 10a of the copper alloy plate 10 to form the plating film 20.

By performing degreasing and pickling and the like on the surface 10a of the copper alloy plate 10, dirt and natural oxide film are removed to clean the surface, then, a Cu plating layer is formed by performing Cu plating treatment on it, and subsequently, Sn plating treatment is performed on the surface of the Cu plating layer to form a Sn plating layer. It is desirable that the above-described Cu plating layer and the Sn plating layer be plating layers of pure copper and pure tin; however, if they are in a range in which the effectiveness of the present invention is not lost, they may be a Cu alloy plating layer and a Sn alloy layer containing the other elements, respectively.

The respective plating layers are formed by electroplating at 0.1 A/dm$^2$ or more and 60 A/dm$^2$ or less of electric current density. If the electric current density while the electroplating is less than 0.1 A/dm$^2$, it is not economical since film forming rate is slow. If the electric current density exceeds 60 A/dm$^2$, it exceeds diffusion-limited current density and a film cannot be formed without defects.

Table 1 shows an example of condition of plating treatment by Cu or Cu alloy; and Table 2 shows an example of plating treatment condition by Sn or Sn alloy.

TABLE 1

| Cu Plating Condition | |
| --- | --- |
| Treatment Method | Electroplating |
| Plating Solution | Cupper Sulfate Plating Solution |
| Liquid Temperature | 27° C. |
| Electric Current Density | 4 A/dm$^2$ |

TABLE 2

| Sn Plating Condition | |
| --- | --- |
| Treatment Method | Electroplating |
| Plating Solution | Tin Sulfate Plating Solution |
| Liquid Temperature | 20° C. |
| Electric Current Density | 2 A/dm$^2$ |

(Reflow Treatment Step)

Next, on the copper alloy plate 10 on which these plating layers are formed, reflow treatment is performed by holding heating peak temperature 230° C. or more and 330° C. or less for 0.5 seconds or more and 30 seconds or less, and then cooling to temperature of 60° C. or less.

By performing this reflow treatment, the plating film 20 is formed to be configured from the Cu layer 21 having the thickness of 0 μm to 1 μm, the Sn—Cu alloy layer 22 having the thickness 0.1 μm to 1.5 μm, and the Sn layer 23 having the thickness 0.1 μm to 3.0 μm in order from the surface 10a of the copper alloy plate 10. In this reflow treatment, there is a case in which all of Cu in the Cu plating layer is alloyed with Sn in the Sn plating layer and the Cu layer 21 is not formed.

By this reflow treatment, there is a possibility that some Cu at the surface 10a of the copper alloy plate 10 is diffused to the plating film 20 and alloyed with Sn which forms the plating film 20; in that case, there is also a possibility that also Zn contained in the copper alloy plate 10 is diffused with Cu into the plating film 20; however, Since the Zn concentration of the surface 10a of the copper alloy plate 10 is formed low, minute Zn is taken into the plating film and it is possible to restrain the surface diffusion of Zn effectively.

Moreover, since the amount of Zn is extremely small on the surface of the copper alloy plate 10, surface oxide is also small in quantity; even if oxide exists to a small degree, it can be easily removed by normal cleansing or the like before the plating treatment. Accordingly, the copper alloy plate 1 with a plating film is excellent in the adhesiveness between the plating film 20 and the copper alloy plate 10.

Furthermore, the oxidized Zn is barely generated also on the surface 20a of the plating film 20, the solder wettability of the plating film 20 is also excellent.

In addition, the plating film 20 of the above-described embodiment is configured of the Cu layer 21, the Sn—Cu alloy layer 22, and the Sn layer 23 in the order on the copper alloy plate 10; however, the plating film is not limited to this, it may be sufficient to be configured from one or more layers selected from tin, copper, zinc, nickel, gold silver, palladium, and alloy of them.

EXAMPLES

Example 1

Preparing ingots of copper alloy consisting of more than 2.0% and 32.5% or less of Zn, 0.1% or more and 0.9% or less of Sn, 0.05% or more and less than 1.0% Ni, 0.001% or more and less than 0.1% of Fe, 0.005% or more and 0.1% or less of P, and the balance Cu and inevitable impurities; copper alloy parent plates having a plate shape were formed by a normal method, such as hot rolling, intermediate annealing, cold rolling, and the like. Some of ingots included 0.001% or more and less than 0.1% of Co.

Next, to the copper alloy parent plates Zn condense treatment was performed by heating with various conditions in oxidizing atmosphere at the heating temperature 200 to 300° C., heating time in a range of one minute to five hours, and then the surface part removal treatment was performed to produce copper alloy plates having various Zn concentration gradients in the surface layer part.

For the surface part removal treatment, any one of the following polishing treatments was performed.
Physical polishing: Buffing
Chemical polishing: Immersion in polishing liquid in which polyoxyethylene dodecyl ether was added to mixed aqueous solution of sulfuric acid and hydrogen peroxide
Electrolytic polishing: Electrifying using SUS304 as a counter electrode in aqueous solution of phosphoric acid
As Comparative Examples, test pieces which were not subjected to the Zn condense treatment and the surface part removal treatment (test pieces just the copper alloy parent plates as they were) were produced.

The Zn concentration at the various parts in the surface and the plate thickness direction of the copper alloy plates were measured. The Zn concentration at the various parts in the plate thickness direction were measured from a concentration profile in a depth direction by X-ray photoelectronic spectroscopy method (XPS). The measuring condition of XPS is the followings.
(Measuring Condition)
Pretreatment: Immersion in an acetone solvent and using an ultrasonic cleaning device and performing a pretreatment at 38 kHz for five minutes
Used device: X-ray photoelectron spectroscopy analyzer, PHI5000 Versa Probe Made by ULVAC PHI
Spattering rate: 100 Å/min
Spattering time: 100 minutes
The depth in the above-described XPS is a depth in terms of $SiO_2$: the depth in terms of $SiO_2$ in the concentration profile in the XPS depth direction was converted into an actual depth by comparing with date measured by TEM-EDX (Energy Dispersive X-ray Spectroscopy) from a cross section direction separately.

The center Zn concentration of the copper alloy plate was measured by collecting a thickness center part where the Zn concentration is stable using a high-frequency inductive coupling plasma emission analysis device (ICP-AES).

Next, after performing treatments such as degreasing, pickling, and the like on the respective copper alloy plates for removing dirt and natural oxide film, the Cu plating layer was formed under the Cu plating condition shown in Table 1, and then the Sn plating layer was formed under the Sn plating condition shown in Table 2, and the copper alloy plate in which these plating layers were formed was subjected to the reflow treatment to produce the copper alloy plate with a plating film.

As the reflow treatment, the plating layers were heated to temperature in a range 230° C. or more and 330° C. or less, and then cooled to temperature of 60° C. or less.

Then, test pieces were cut from the respective copper alloy plates with the plating film to measure the Zn concentration in the plating film. The Zn concentration to the plating film was obtained from the concentration profile in the depth direction from the surface by XPS as in the case of the above-described copper alloy plate.

Regarding the test pieces of the unprocessed material of the respective copper alloy plates (the copper alloy plates on which the plating film was not formed) and the copper alloy plates with the plating film, the soldering wettability of the surface was measured, and surface hardness of the unprocessed material (the copper alloy plate) and the adhesiveness of the plating film to the copper alloy plate with the plating film were measured.

<Solder Wettability>

Regarding the solder wettability, conforming to the solderability testing method (balance method) JIS-C60068-2-54, using 5200TN solder checker made by Rhesca Co., LTD., after removing dirt by degreasing, the wettability between the respective test pieces and lead-free solder was evaluated with coating the flowing flux and the soldering condition.
(Flux Coating)
Flux: 25% rosin-ethanol
Flux temperature: Room temperature
Flux depth: 8 mm
Flux immersion time: five seconds Drip stop method: Edge is applied to filter paper for five seconds to remove flux, and fixed to device and held for 30 seconds (Soldering)

Solder composition: Sn-3.0%-Ag-0.5% Cu made by Senju Metal Industry Co., Ltd.
Solder temperature: 240° C.
Solder immersion speed: 10±2.5 mm/second
Solder immersion depth: 2 mm
Solder immersion time: 10 seconds From the obtained load/time curve, zero cross time (seconds) was set to the time from start of the immersion until buoyant force by surface tension became zero (i.e., a contact angle between solder and the test piece was 90°). Regarding the solder wettability, it was evaluated as "A" (good) if the zero cross time was less than two seconds, "B" (acceptable) if it was two seconds or more and less than four seconds, and or "C" (bad) if it was four seconds or more.

<Adhesiveness>

The adhesiveness was evaluated on the test pieces which were heated at 120° C. for 1000 hours by the cross-cut test. Scratches were formed on the test pieces by a box cutter to form 100 square grids of 1 mm square, then a cellophane tape (#405 made by Nichiban Co., Ltd.) was pressed on the grids by fingers, and then the cellophane tape was peeled off; it was evaluated as "A" if the plating film was not peeled off, "B" if three or less of the grids were peeled off, or "C" if four or more of the grids were peeled off.

<Surface Hardness>

Measuring objects of the surface hardness of were the unprocessed material (the copper alloy plates) on which the plating film was not formed. Using the Vickers hardness meter to measure the hardness when the load was 1 gf and 10 gf, it was evaluated "A" (good) if the hardness measured at the load 1 gf was 80% or more of the hardness measured at the load 10 gf; "B" (acceptable) if it was 70% or more and less than 80%, or "C" (bad) if it was less than 70%.

Tables 3A and 3B, and Tables 4A, 4B and 4C shows evaluation results of the test pieces of the respective unprocessed material (the copper alloy plates); Tables 5A and 5B, and Tables 6A, 6b, and 6C shows evaluation results of the test pieces of the copper alloy plates with the plating film.

In all Tables, the "center Zn concentration" is the Zn concentration at the center part in the plate thickness, the "center Sn, Ni, Fe, P, Co concentration is a concentration of Sn, Ni, Fe, P, Co at the center part of the plate thickness; and the "surface Zn concentration" is a Zn concentration at the surface of the copper alloy plate at a phase in which the surface part removal treatment has been subjected to: the unit is % by mass. "Concentration ratio to center" is a ratio of the surface Zn concentration to the center Zn concentration, and the unit is %. "Surface layer part thickness" is a depth from the surface of the copper alloy plate to where the Zn concentration first achieve 90% of the center Zn concentration, and the unit is μm; and the "concentration gradient" is the gradient of the Zn concentration in the surface layer part, and the unit is mass %/μm.

The surface layer part thickness and the concentration gradient are calculated from the concentration profile in the depth direction of the Zn component by XPS. FIG. 2 is an example of the profile, regarding the samples having 10 mass % of the center Zn concentration in Table 4 and having 130 mass %/μm of the concentration gradient. Including this example, in the test pieces in Table 3 and Table 4, the copper alloy plates having various surface Zn concentration were produced. In the test pieces of Table 5 and Table 6, the plating film was formed on the copper alloy plates in Table 3 and Table 4.

The concentration gradient means slope of a straight line connecting the concentration of the surface in the profile with a point where 90% of the plate thickness center part concentration is first achieved. That is, in the concentration profile in the depth direction, if the change of the Zn concentration from the surface of the copper alloy plate to the point where 90% of the plate thickness center part concentration is first achieved can be considered as a straight line having a substantially constant slope even if there is a local variation, the slope of the profile is defined as the concentration gradient.

Each center Zn concentration is organized into the tables; the center Zn concentration is 2.1 mass % in Table 3A, 10 mass % in Table 3B, 20 mass % in Table 4A, 32.5 mass % in Table 4B, 20 mass % in Table 4C, 2.1 mass % in Table 5A, 10 mass % in Table 5B, 20 mass % in Table 6A, 32.5 mass % in Table 6B, and 2.1 mass % in Table 6C.

In Tables 5A and 5B, and Tables 6A, 6B, and 6C, the unit of the thickness of the Cu plating layer is μm; the thickness "0" of the Cu plating layer is an example in which the Cu plating is subjected to but only the Sn plating treatment was performed. The thickness of the Sn plating layer was 1 μm.

TABLE 3A

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Solder wettability | Surface hardness |
|---|---|---|---|---|---|---|---|
| Sn: 0.34 Ni: 0.25 Fe: 0.039 P: 0.025 Co: 0.034 | 10 | Physical Polish | 0.57 | 27.1 | 0.132 | A | A |
| | | Chemical Polish | 0.70 | 33.3 | 0.119 | A | A |
| | | Electrolytic Polish | 0.02 | 1.0 | 0.187 | A | A |
| | 50 | Physical Polish | 0.25 | 11.9 | 0.033 | A | A |
| | | Chemical Polish | 0.63 | 30.0 | 0.025 | A | A |
| | | Electrolytic Polish | 0.09 | 4.3 | 0.036 | A | A |
| | 200 | Physical Polish | 0.36 | 17.1 | 0.008 | A | A |
| | | Chemical Polish | 0.04 | 1.9 | 0.009 | A | A |

TABLE 3A-continued

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Solder wettability | Surface hardness |
|---|---|---|---|---|---|---|---|
| | | Electrolytic Polish | 1.13 | 53.8 | 0.004 | B | A |
| | 500 | Physical Polish | 1.19 | 56.7 | 0.001 | B | A |
| | | Chemical Polish | 1.22 | 58.1 | 0.001 | B | A |
| | | Electrolytic Polish | 1.01 | 48.1 | 0.002 | B | A |
| | 1000 | Physical Polish | 0.01 | 0.5 | 0.002 | B | A |
| | | Chemical Polish | 0.31 | 14.8 | 0.002 | B | A |
| | | Electrolytic Polish | 1.03 | 49.0 | 0.001 | B | A |

TABLE 3B

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Solder wettability | Surface hardness |
|---|---|---|---|---|---|---|---|
| Sn: 0.68 Ni: 0.58 P: 0.019 Fe: 0.045 Co: 0 | 10 | Physical Polish | 0.58 | 5.8 | 0.842 | A | B |
| | | Chemical Polish | 4.88 | 48.8 | 0.412 | B | B |
| | | Electrolytic Polish | 1.86 | 18.6 | 0.714 | A | B |
| | 50 | Physical Polish | 2.85 | 28.5 | 0.123 | A | A |
| | | Chemical Polish | 4.72 | 47.2 | 0.086 | B | A |
| | | Electrolytic Polish | 1.57 | 15.7 | 0.149 | A | A |
| | 130 | Physical Polish | 4.24 | 42.4 | 0.037 | B | A |
| | | Chemical Polish | 0.88 | 8.8 | 0.062 | A | A |
| | | Electrolytic Polish | 3.88 | 38.8 | 0.039 | A | A |
| | 500 | Physical Polish | 3.56 | 35.6 | 0.011 | A | A |
| | | Chemical Polish | 2.30 | 23.0 | 0.013 | A | A |
| | | Electrolytic Polish | 5.84 | 58.4 | 0.006 | B | A |
| | 1000 | Physical Polish | 4.59 | 45.9 | 0.004 | B | A |
| | | Chemical Polish | 1.68 | 16.8 | 0.007 | B | A |
| | | Electrolytic Polish | 3.83 | 38.3 | 0.005 | B | A |

TABLE 4A

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Solder wettability | Surface hardness |
|---|---|---|---|---|---|---|---|
| Sn: 0.16 Ni: 0.89 P: 0.073 Fe: 0.009 Co: 0 | 10 | Physical Polish | 11.08 | 55.4 | 0.692 | B | B |
| | | Chemical Polish | 5.06 | 25.3 | 1.294 | A | B |
| | | Electrolytic Polish | 3.29 | 16.5 | 1.471 | A | B |

TABLE 4A-continued

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Solder wettability | Surface hardness |
|---|---|---|---|---|---|---|---|
| | 50 | Physical Polish | 1.16 | 5.8 | 0.337 | A | B |
| | | Chemical Polish | 6.98 | 34.9 | 0.220 | A | B |
| | | Electrolytic Polish | 8.34 | 41.7 | 0.193 | B | A |
| | 200 | Physical Polish | 7.70 | 38.5 | 0.052 | A | A |
| | | Chemical Polish | 1.30 | 6.5 | 0.084 | A | A |
| | | Electrolytic Polish | 2.93 | 14.7 | 0.075 | A | A |
| | 500 | Physical Polish | 3.69 | 18.5 | 0.029 | A | A |
| | | Chemical Polish | 1.96 | 9.8 | 0.032 | A | A |
| | | Electrolytic Polish | 5.93 | 29.7 | 0.024 | A | A |
| | 1000 | Physical Polish | 4.00 | 20.0 | 0.014 | B | A |
| | | Chemical Polish | 7.74 | 38.7 | 0.010 | B | A |
| | | Electrolytic Polish | 1.92 | 9.6 | 0.016 | B | A |

TABLE 4B

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Solder wettability | Surface hardness |
|---|---|---|---|---|---|---|---|
| Sn: 0.27 Ni: 0.44 P: 0.006 Fe: 0.082 Co: 0.003 | 10 | Physical Polish | 16.40 | 50.5 | 1.285 | B | B |
| | | Chemical Polish | 11.40 | 35.1 | 1.785 | A | B |
| | | Electrolytic Polish | 0.30 | 0.9 | 2.895 | A | B |
| | 50 | Physical Polish | 7.88 | 24.2 | 0.427 | A | B |
| | | Chemical Polish | 16.73 | 51.5 | 0.250 | B | B |
| | | Electrolytic Polish | 11.66 | 35.9 | 0.352 | A | B |
| | 200 | Physical Polish | 0.50 | 1.5 | 0.144 | A | A |
| | | Chemical Polish | 19.15 | 58.9 | 0.051 | B | A |
| | | Electrolytic Polish | 6.61 | 20.3 | 0.113 | A | A |
| | 500 | Physical Polish | 14.20 | 43.7 | 0.030 | B | A |
| | | Chemical Polish | 6.64 | 20.4 | 0.045 | A | A |
| | | Electrolytic Polish | 18.12 | 55.8 | 0.022 | B | A |
| | 1000 | Physical Polish | 9.60 | 29.5 | 0.020 | B | A |
| | | Chemical Polish | 8.05 | 24.8 | 0.021 | B | A |
| | | Electrolytic Polish | 0.29 | 0.9 | 0.029 | B | A |

TABLE 4C

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Solder wettability | Surface hardness |
|---|---|---|---|---|---|---|---|
| Sn: 0.86<br>Ni: 0.71<br>P: 0.083<br>Fe: 0.069<br>Co: 0.021 | ∞(unprocessed) | — | 2.10 | 10.5 | — | C | A |
|  | 5 | Physical Polish | 0.26 | 1.3 | 3.548 | A | C |
|  |  | Chemical Polish | 0.60 | 3.0 | 3.480 | A | C |
|  |  | Electrolytic Polish | 1.23 | 6.2 | 3.354 | A | c |
|  | 1100 | Physical Polish | 1.38 | 6.9 | 0.015 | C | A |
|  |  | Chemical Polish | 0.95 | 4.8 | 0.016 | C | A |
|  |  | Electrolytic Polish | 0.18 | 0.9 | 0.016 | C | A |

TABLE 5A

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Cu Plating | Adhesiveness | Solder wettability |
|---|---|---|---|---|---|---|---|---|
| Sn: 0.34<br>Ni: 0.25<br>Fe: 0.039<br>P: 0.025<br>Co: 0.034 | 10 | Physical Polish | 0.57 | 27.1 | 0.132 | 0 | A | A |
|  |  |  |  |  |  | 1.0 | A | A |
|  |  | Chemical Polish | 0.70 | 33.3 | 0.119 | 0 | A | A |
|  |  |  |  |  |  | 1.0 | A | A |
|  |  | Electrolytic Polish | 0.02 | 1.0 | 0.187 | 0 | A | A |
|  |  |  |  |  |  | 1.0 | A | A |
|  | 50 | Physical Polish | 0.25 | 11.9 | 0.033 | 0 | A | A |
|  |  |  |  |  |  | 1.0 | A | A |
|  |  | Chemical Polish | 0.63 | 30.0 | 0.025 | 0 | A | A |
|  |  |  |  |  |  | 1.0 | A | A |
|  |  | Electrolytic Polish | 0.09 | 4.3 | 0.036 | 0 | A | A |
|  |  |  |  |  |  | 1.0 | A | A |
|  | 200 | Physical Polish | 0.36 | 17.1 | 0.008 | 0 | A | A |
|  |  |  |  |  |  | 1.0 | A | A |
|  |  | Chemical Polish | 0.04 | 1.9 | 0.009 | 0 | A | A |
|  |  |  |  |  |  | 1.0 | A | A |
|  |  | Electrolytic Polish | 1.13 | 53.8 | 0.004 | 0 | B | B |
|  |  |  |  |  |  | 1.0 | A | B |
|  | 500 | Physical Polish | 1.19 | 56.7 | 0.001 | 0 | B | B |
|  |  |  |  |  |  | 1.0 | A | B |
|  |  | Chemical Polish | 1.22 | 58.1 | 0.001 | 0 | B | B |
|  |  |  |  |  |  | 1.0 | A | B |
|  |  | Electrolytic Polish | 1.01 | 48.1 | 0.002 | 0 | B | B |
|  |  |  |  |  |  | 1.0 | A | B |
|  | 1000 | Physical Polish | 0.01 | 0.5 | 0.002 | 0 | B | B |
|  |  |  |  |  |  | 1.0 | A | B |
|  |  | Chemical Polish | 0.31 | 14.8 | 0.002 | 0 | B | B |
|  |  |  |  |  |  | 1.0 | A | B |
|  |  | Electrolytic Polish | 1.03 | 49.0 | 0.001 | 0 | B | B |
|  |  |  |  |  |  | 1.0 | A | B |

TABLE 5B

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Cu Plating | Adhesiveness | Solder wettability |
|---|---|---|---|---|---|---|---|---|
| Sn: 0.68<br>Ni: 0.58<br>P: 0.019<br>Fe: 0.045<br>Co: 0 | 10 | Physical polish | 0.58 | 5.8 | 0.842 | 0 | A | A |
|  |  |  |  |  |  | 1.0 | A | A |
|  |  | Chemical polish | 4.88 | 48.8 | 0.412 | 0 | B | B |
|  |  |  |  |  |  | 1.0 | A | B |
|  |  | Electrolytic polish | 1.86 | 18.6 | 0.714 | 0 | A | A |
|  |  |  |  |  |  | 1.0 | A | A |

TABLE 5B-continued

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Cu Plating | Adhesiveness | Solder wettability |
|---|---|---|---|---|---|---|---|---|
| | 50 | Physical polish | 2.85 | 28.5 | 0.123 | 0 | A | A |
| | | | | | | 1.0 | A | A |
| | | Chemical polish | 4.72 | 47.2 | 0.086 | 0 | B | B |
| | | | | | | 1.0 | A | B |
| | | Electrolytic polish | 1.57 | 15.7 | 0.149 | 0 | A | A |
| | | | | | | 1.0 | A | A |
| | 130 | Physical polish | 4.24 | 42.4 | 0.037 | 0 | B | B |
| | | | | | | 1.0 | A | B |
| | | Chemical polish | 0.88 | 8.8 | 0.062 | 0 | A | A |
| | | | | | | 1.0 | A | A |
| | | Electrolytic polish | 3.88 | 38.8 | 0.039 | 0 | A | A |
| | | | | | | 1.0 | A | A |
| | 500 | Physical polish | 3.56 | 35.6 | 0.011 | 0 | A | A |
| | | | | | | 1.0 | A | A |
| | | Chemical polish | 2.30 | 23.0 | 0.013 | 0 | A | A |
| | | | | | | 1.0 | A | A |
| | | Electrolytic polish | 5.84 | 58.4 | 0.006 | 0 | B | B |
| | | | | | | 1.0 | A | B |
| | 1000 | Physical polish | 4.59 | 45.9 | 0.004 | 0 | B | B |
| | | | | | | 1.0 | A | B |
| | | Chemical polish | 1.68 | 16.8 | 0.007 | 0 | B | B |
| | | | | | | 1.0 | A | B |
| | | Electrolytic polish | 3.83 | 38.3 | 0.005 | 0 | B | B |
| | | | | | | 1.0 | A | B |

TABLE 6A

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Cu Plating | Adhesiveness | Solder wettability |
|---|---|---|---|---|---|---|---|---|
| Sn: 0.16 | 10 | Physical polish | 11.08 | 55.4 | 0.692 | 0 | B | B |
| Ni: 0.89 | | | | | | 1.0 | A | B |
| P: 0.073 | | Chemical polish | 5.06 | 25.3 | 1.294 | 0 | A | A |
| Fe: 0.009 | | | | | | 1.0 | A | A |
| Co: 0 | | Electrolytic polish | 3.29 | 16.5 | 1.471 | 0 | A | A |
| | | | | | | 1.0 | A | A |
| | 50 | Physical polish | 1.16 | 5.8 | 0.337 | 0 | A | A |
| | | | | | | 1.0 | A | A |
| | | Chemical polish | 6.98 | 34.9 | 0.220 | 0 | A | A |
| | | | | | | 1.0 | A | A |
| | | Electrolytic polish | 8.34 | 41.7 | 0.193 | 0 | B | B |
| | | | | | | 1.0 | A | B |
| | 200 | Physical polish | 7.70 | 38.5 | 0.052 | 0 | A | A |
| | | | | | | 1.0 | A | A |
| | | Chemical polish | 1.30 | 6.5 | 0.084 | 0 | A | A |
| | | | | | | 1.0 | A | A |
| | | Electrolytic polish | 2.93 | 14.7 | 0.075 | 0 | A | A |
| | | | | | | 1.0 | A | A |
| | 500 | Physical polish | 3.69 | 18.5 | 0.029 | 0 | A | A |
| | | | | | | 1.0 | A | A |
| | | Chemical polish | 1.96 | 9.8 | 0.032 | 0 | A | A |
| | | | | | | 1.0 | A | A |
| | | Electrolytic polish | 5.93 | 29.7 | 0.024 | 0 | A | A |
| | | | | | | 1.0 | A | A |
| | 1000 | Physical polish | 4.00 | 20.0 | 0.014 | 0 | B | A |
| | | | | | | 1.0 | A | A |
| | | Chemical polish | 7.74 | 38.7 | 0.010 | 0 | B | A |
| | | | | | | 1.0 | A | A |
| | | Electrolytic polish | 1.92 | 9.6 | 0.016 | 0 | B | A |
| | | | | | | 1.0 | A | A |

TABLE 6B

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Cu Plating | Adhesiveness | Solder wettability |
|---|---|---|---|---|---|---|---|---|
| Sn: 0.27 | 10 | Physical polish | 16.40 | 50.5 | 1.285 | 0 | B | B |
| Ni: 0.44 |  |  |  |  |  | 1.0 | A | B |
| P: 0.006 |  | Chemical polish | 11.40 | 35.1 | 1.785 | 0 | A | A |
| Fe: 0.082 |  |  |  |  |  | 1.0 | A | A |
| Co: 0.003 |  | Electrolytic polish | 0.30 | 0.9 | 2.895 | 0 | A | A |
|  |  |  |  |  |  | 1.0 | A | A |
|  | 50 | Physical polish | 7.88 | 24.2 | 0.427 | 0 | A | A |
|  |  |  |  |  |  | 1.0 | A | A |
|  |  | Chemical polish | 16.73 | 51.5 | 0.250 | 0 | B | B |
|  |  |  |  |  |  | 1.0 | A | B |
|  |  | Electrolytic polish | 11.66 | 35.9 | 0.352 | 0 | A | A |
|  |  |  |  |  |  | 1.0 | A | A |
|  | 200 | Physical polish | 0.50 | 1.5 | 0.144 | 0 | A | A |
|  |  |  |  |  |  | 1.0 | A | A |
|  |  | Chemical polish | 19.15 | 58.9 | 0.051 | 0 | B | B |
|  |  |  |  |  |  | 1.0 | A | B |
|  |  | Electrolytic polish | 6.61 | 20.3 | 0.113 | 0 | A | A |
|  |  |  |  |  |  | 1.0 | A | A |
|  | 500 | Physical polish | 14.20 | 43.7 | 0.030 | 0 | B | B |
|  |  |  |  |  |  | 1.0 | A | A |
|  |  | Chemical polish | 6.64 | 20.4 | 0.045 | 0 | B | A |
|  |  |  |  |  |  | 1.0 | A | A |
|  |  | Electrolytic polish | 18.12 | 55.8 | 0.022 | 0 | B | B |
|  |  |  |  |  |  | 1.0 | A | B |
|  | 1000 | Physical polish | 9.60 | 29.5 | 0.020 | 0 | B | B |
|  |  |  |  |  |  | 1.0 | A | B |
|  |  | Chemical polish | 8.05 | 24.8 | 0.021 | 0 | B | B |
|  |  |  |  |  |  | 1.0 | A | B |
|  |  | Electrolytic polish | 0.29 | 0.9 | 0.029 | 0 | B | B |
|  |  |  |  |  |  | 1.0 | A | B |

TABLE 6C

| Center Sn, Ni, Fe, P, Co concentration (mass %) | Concentration gradient (mass %/μm) | Removal method | Surface Zn concentration (mass %) | Concentration ratio to center (%) | Surface layer part thickness (μm) | Cu Plating | Adhesiveness | Solder wettability |
|---|---|---|---|---|---|---|---|---|
| Sn: 0.86 | ∞ (unprocessed) | — | 2.10 | 100.0 | — | 0 | C | C |
| Ni: 0.71 |  |  |  |  |  | 1.0 | C | A |
| P: 0.083 | 1100 | Physical Polish | 1.38 | 65.7 | 0.000 | 0 | C | C |
| Fe: 0.069 |  |  |  |  |  | 1.0 | C | C |
| Co: 0.021 |  | Chemical Polish | 0.95 | 45.2 | 0.001 | 0 | C | C |
|  |  |  |  |  |  | 1.0 | C | C |
|  |  | Electrolytic Polish | 0.18 | 8.6 | 0.002 | 0 | C | C |
|  |  |  |  |  |  | 1.0 | C | A |

As shown in Table 3 and Table 4, ones in which the copper alloy plates are not subjected to the Zn condense treatment and the surface part removal treatment (a state in which the concentration gradient is "∞ (unprocessed)" and the Zn concentration gradient from the plate surface is extremely drastic) and ones in which the Zn concentration gradient from the plate surface exceeds 1000 mass %/μm were bad in the solder wettability. For the surface hardness, in the material in which the center Zn concentration is 20 mass %, ones in which the Zn concentration gradient is less than 10 mass %/μm were remarkably deteriorated in the surface hardness.

Moreover, as shown in Table 5 and Table 6, in ones in which the copper alloy plate is not subjected to the Zn condense treatment and the surface part removal treatment (the concentration gradient is "∞ (unprocessed)" and the Zn concentration gradient from the plate surface is extremely drastic) and ones in which the Zn concentration gradient exceeds 1000 mass %/μm, the adhesiveness was bad in forming the plating film.

Example 2

The copper alloy plates with the plating film were produced by producing the copper alloy plates having various concentration gradients in material having the center Zn concentration 32.5 mass % by the same method as in Example 1, and then plating by the same method as in Example 1.

The Zn concentration in the Sn plating layer and the solder wettability in the produced copper alloy plates with the plating film were determined. The Zn concentration in the Sn plating layer was measured by the same condition as in Example 1 using XPS. The results are shown in Table 7.

TABLE 7

| Cu plating (μm) | Concentration gradient (mass %/μm) | Concentration ratio to center (%) | Solder wettability |
|---|---|---|---|
| 1.0 | 10 | 0.1 | A |
| | 50 | 0.4 | A |
| | 200 | 1.7 | A |
| | 500 | 4.5 | A |
| | 1000 | 9.5 | B |
| | 1200 | 11.3 | C |
| | 1500 | 14.1 | C |

As shown in Table 7, in the test pieces in which the concentration gradient exceeds 1000 mass %/μm, the concentration ratio to the center of Zn in the plating exceeded 10% and the solder wettability was deteriorated.

Example 3

Test pieces of copper alloy plate having the center Zn concentration 20 mass % and the concentration gradient 10 mass %/μm were produced by the same method as in Example 1. By changing the removal amount in the surface part removal treatment in producing, the test pieces had the same concentration gradient but different surface Zn concentration. The produced test pieces were made into the copper alloy plates with the plating film by performing the plating treatment by the same method as in Example 1, and the plating adhesiveness and the solder wettability were measured. The results are shown in Table 8.

TABLE 8

| Bulk Zn concentration (mass %) | Concentration gradient (mass %/μm) | Surface Zn concentration (mass %) | Concentration ratio to center (%) | Cu plating | Adhesiveness | Solder Wettability |
|---|---|---|---|---|---|---|
| 20 | 10 | 0 | 0.0 | 0 | A | A |
| | | | | 1.0 | A | A |
| | | 4.9 | 24.5 | 0 | A | A |
| | | | | 1.0 | A | A |
| | | 6.2 | 31.0 | 0 | A | A |
| | | | | 1.0 | A | A |
| | | 12.5 | 62.5 | 0 | A | C |
| | | | | 1.0 | C | A |
| | | 14.4 | 72.0 | 0 | A | C |
| | | | | 1.0 | C | A |

As shown in Table 8, in the test pieces in which the surface Zn concentration exceeded 60% of the center Zn concentration, the plating adhesiveness and the solder wettability were deteriorated.

Example 4

By the same method as in Example 1, the copper alloy plates (unprocessed material) in which the Zn concentration at the center part of the plate thickness of the copper alloy plates (the center Zn concentration) was 32.5 mass % and having various concentration gradient in the surface layer part and the surface Zn concentration is adjusted to 0 mass % were produced, and then only one layer among the metal plating layer shown in Table 9 was formed. In the present example, only the plating treatment was performed but the reflow treatment was not performed.

Metal species of plating was Sn, Cu, Zn, Ni, Au, Ag, and Pd. The plating electric current density was 3 A/dm$^2$ in all and the thickness of the plating film was 1 μm. Generally used plating baths such as acidic, neutral, and alkaline baths may be used; in the present example, the acid bath was used for Sn, Cu, Zn, Ni, and Pd and the alkaline bath was used for Au and Ag.

The solder wettability and the adhesiveness of the plating film of the test pieces produced by the above-described steps were evaluated. The evaluation method and the judging method are the same in Example 1.

The evaluation results are shown in Table 9.

TABLE 9

| Surface layer part thickness (μm) | Concentration gradient (mass %/μm) | Plating type | Adhesiveness | Solder wettability |
|---|---|---|---|---|
| 2.93 | 10 | Sn | A | A |
| | | Cu | A | A |
| | | Zn | A | A |
| | | Ni | A | A |
| | | Au | A | A |
| | | Ag | A | A |
| | | Pd | A | A |
| 0.03 | 1000 | Sn | A | A |
| | | Cu | A | A |
| | | Zn | A | A |
| | | Ni | A | A |
| | | Au | A | A |
| | | Ag | A | A |
| | | Pd | A | A |
| — | ∞ (unprocessed) | Sn | C | A |
| | | Cu | C | A |
| | | Zn | C | A |
| | | Ni | C | A |
| | | Au | C | A |

TABLE 9-continued

| Surface layer part thickness (μm) | Concentration gradient (mass %/μm) | Plating type | Adhesiveness | Solder wettability |
|---|---|---|---|---|
| | | Ag | C | A |
| | | Pd | C | A |
| 0.027 | 1100 | Sn | C | A |
| | | Cu | C | A |
| | | Zn | C | A |
| | | Ni | C | A |
| | | Au | C | A |
| | | Ag | C | A |
| | | Pd | C | A |

As shown in Table 9, although the solder wettability was good in both Example and comparative examples, the test pieces in which the Zn condense treatment and the surface to part removal treatment are not performed (the concentration gradient is "∞ (unprocessed)" and the test pieces in which the Zn concentration gradient exceeds 1000 mass %/μm as in the comparative example, the peeling of the plating film occurred after heating.

Although the plating film is only one layer in the examples, it does not limit the embodiment: various kinds of metals may be alloyed by processing such as heating in order to reduce the cost and further improve the characteristics, and a multi-layer plating film structure may be used.

For example, in a combination of the above-described Cu plating layer and the Sn plating layer, when reflow treatment cannot be performed due to some characteristic, a pure tin plating layer may form an alloy layer which is not intended over time between copper (the copper alloy plate or the Cu plating layer) in the base, and there is a possibility that whiskers occur due to factors such as internal stress of the plating layer caused by the alloy layer. In this case, the Sn plating layer may be an alloy plating layer with Sn, Cu, Ag, and the like in order to restrain the whiskers. Moreover, in order to prevent copper in the copper alloy plate from diffusing into the plating layer (e.g., the tin layer) and forming an alloy, it is possible to form an intermediate layer (e.g., an electrolytic nickel-plating layer) suppressing the diffusion.

INDUSTRIAL APPLICABILITY

It is possible to suppress the oxidization of the surface and improve the electric connection reliability, reduce the Zn concentration in the plating film even when the plating film is formed, and reduce the contact electric resistance on the surface of the plating film and improve the adhesiveness between the plating film and the copper alloy plate.

REFERENCE SIGNS LIST

1 Copper alloy plate with plating film
10 Copper alloy plate
11 Surface layer part
12 Base material inner part
20 Plating film
21 Cu layer
22 Sn—Cu alloy layer
23 Sn layer

The invention claimed is:

1. A copper alloy plate comprising a surface layer part, wherein in a center in a plate thickness direction more than 2% (% by mass, the same hereafter) and 32.5% or less of Zn as a center Zn concentration; 0.1% or more and 0.9% or less of Sn; 0.05% or more and less than 1.0% of Ni; 0.001% or more and less than 0.1% of Fe, and 0.005% or more and 0.1% or less of P; and the balance Cu with inevitable impurities are contained,
wherein a surface Zn concentration at a surface of the copper alloy plate is 40% or less of the center Zn concentration,
wherein the surface layer part has a depth from the surface to where Zn concentration is 90% of the center Zn concentration; and
wherein in the surface layer part, the Zn concentration increases from the surface toward the center at a concentration gradient of 10% by mass/μm or more and 1000% by mass/μm or less, and the Zn concentration in the surface layer part does not decrease from the surface Zn concentration.

2. The copper alloy plate according to claim 1, further containing 0.001% or more and less than 0.1% of Co.

3. The copper alloy plate according to claim 1, wherein a thickness of the surface layer part is 1 μm or less.

4. A copper alloy plate with a plating film comprising the copper alloy plate according to claim 1 and a plating film formed on the surface layer part of the copper alloy plate.

5. The copper alloy plate with the plating film according to claim 4, wherein an average concentration of Zn in the plating film is 10% or less of the center Zn concentration.

6. The copper alloy plate with the plating film according to claim 4, wherein the plating film consists of one or more layers selected from tin, copper, zinc, gold, silver, palladium, and alloy of them.

7. A method of manufacturing the copper alloy plate according to claim 1 comprising steps of
a Zn condense treatment step in diffusing Zn on a surface and concentrating Zn to form a surface part in which Zn is concentrated; and
a surface part removal treatment step in removing the surface part and forming the surface layer part.

8. A method of manufacturing the copper alloy plate with a plating film according to claim 4, wherein the plating film is formed by electroplating at 0.1 A/dm$^2$ or more and 60 A/dm$^2$ or less of an electric current density.

9. The method of manufacturing the copper alloy plate with a plating film according to claim 8, wherein
the plating film contains tin; and
after the electroplating treatment is performed, reflow treatment is performed at 230° C. or more and 330° C. or less of heating peak temperature for 0.5 seconds or more and 30 seconds or less of heating time at the heating peak temperature.

* * * * *